United States Patent [19]

Huitema

[11] 4,449,416
[45] May 22, 1984

[54] TRANSMISSION CONTROL SYSTEM

[75] Inventor: Thomas W. Huitema, Racine, Wis.

[73] Assignee: J. I. Case Company, Racine, Wis.

[21] Appl. No.: 299,318

[22] Filed: Sep. 4, 1981

[51] Int. Cl.³ .................... F16H 5/42; B60K 20/02; G05G 5/10; F16D 19/00

[52] U.S. Cl. .................... 74/336 R; 74/365; 74/375; 74/473 R; 74/477; 74/DIG. 7; 74/89.14; 74/89.15; 192/3.63; 192/30 W; 192/94; 192/103 R; 192/109 A

[58] Field of Search .............. 74/477, 473 R, DIG. 7, 74/527, 752 D, 365, 375, 336 R, 89.14, 89.15; 192/109 A, 30 W, 94, 103 R, 3.63

[56] References Cited

U.S. PATENT DOCUMENTS

| 1,225,144 | 5/1917 | Land | 192/109 A |
|---|---|---|---|
| 1,258,921 | 3/1918 | McCarrell | 74/477 |
| 1,546,672 | 7/1925 | Peacock | 74/477 |
| 1,696,178 | 12/1928 | Ahlm | 74/477 |
| 1,822,335 | 9/1931 | Brown | 192/94 |
| 2,280,641 | 4/1942 | Snow | 74/477 |
| 2,508,564 | 5/1950 | Cardwell et al. | 74/477 |
| 3,319,479 | 5/1967 | Iavelli et al. | 74/477 |
| 3,367,205 | 2/1968 | Ratliff | 74/477 |
| 3,625,633 | 12/1971 | Nelson | 192/94 |
| 4,381,166 | 4/1983 | Smart | 74/89.15 |

Primary Examiner—Allan D. Herrmann
Assistant Examiner—Bruce F. Wojciechowski
Attorney, Agent, or Firm—Dressler, Goldsmith, Shore, Sutker & Milnamow, Ltd.

[57] ABSTRACT

A four speed, constant mesh transmission includes an input and an output shaft with four pairs of driver and driven gears respectively spaced on the two shafts. A pair of gear couplings are slidably disposed on the output shaft and splined for rotation therewith. Each gear coupling is selectively moved along the shaft for engagement with one of the driven gears by means of a pair of shift forks respectively engaged with the gear couplings. The two shift forks are slidably disposed on a guide rail which extends parallel to the input and output shafts of the transmission. Each shift fork includes a solenoid lock which may be selectively engaged with the guide rail for preventing sliding movement of the shift fork with respect thereto.

31 Claims, 5 Drawing Figures

TRANSMISSION CONTROL SYSTEM

BACKGROUND OF THE INVENTION

This invention pertains generally to power driven transmission assemblies, and more particularly to a motor driven, electrically operated transmission gear shifter for selective engagement of one of the gear ratios in the transmission.

A variety of transmissions and gear ratio selection systems are known in the art, with many being adaptable for use in heavy duty equipment, such as tractors. For instance, many systems consist of an arrangement for manually selecting gear ratios, while others use hydraulically operated gear shifting arrangements. Still others employ a combination of manually and hydraulically operated systems. Although commonly used, manually operated systems may be difficult to shift, requiring substantial physical effort on the part of the equipment operator. Naturally, this increases fatigue of the operator, and may affect efficient and convenient control of the equipment. The subject invention improves upon these types of transmission shifting arrangements by providing a motor driven, electrically operated gear selection and actuation system for a transmission.

SUMMARY OF THE INVENTION

The present invention comprises a novel motor driven electrically controlled gear selection system for a motive power transmission. As disclosed herein, the gear selection system is shown in conjunction with a four-speed, constant-mesh heavy duty equipment transmission. It will be understood, however, that the subject invention would be equally adaptable to transmissions other than ones having this particular constant mesh configuration. The transmission includes an input shaft and an output shaft disposed in parallel relation to each other. Four pairs of driver and driven gears, each pair providing one of the ratios for the four speed transmission, are disposed in spaced relation along the respective shafts. In a constant mesh transmission of this type, each of the driver gears, which are disposed along the input shaft of the transmission, is always in engagement with its respective driven gear. Typically, each driver is splined to the input shaft, or "integral" with respect thereto. Each of the driven gears carried by the output shaft are rotatably supported or "free wheeling" with respect thereto. Effectuation of the selected gear ratio is made possible by the use of gear couplings disposed adjacent to the driven gears on the output shaft, the couplings being splined or keyed for rotation therewith. The gear couplings are slidable axially with respect to the output shaft. The subject invention discloses an arrangement wherein the output shaft has supported thereon first and second driven gears, with an associated gear coupling mounted therebetween, and third and fourth driven gears with another gear coupling associated therewith. Each of the gear couplings typically includes a pair of dog clutches each of which is adapted to engage a respective driven gear in power-transmitting engagement. Power transmission through the selected gear ratio is made possible by axially sliding one of the gear couplings such that one of its dog clutches engages the driven gear of the desired ratio. Because the gear couplings are splined for rotation with the output shaft, the selected driven gear transmits power from its respective driver on the input shaft through one of the dog clutches of the gear coupling, and thereby also rotates the output shaft, in unison with its respective driven gear for transmission of power to the output shaft. The axial sliding of the appropriate gear coupling is effected by the use of shift forks, each of which engages one of the gear couplings, and permits rotation of the gear coupling with respect thereto. The shift forks are slidably disposed upon a shift or guide rail which extends parallel to the input and output shafts of the transmission. Sliding movement of one of the shift forks along the guide rail results in axial movement of the gear coupling with respect to the output shaft for effecting power transmission to the output shaft through one of the driven gears and one of the dog clutches. When each of the gear couplings is maintained by the shift forks such that none of the dog clutches engage its respective driven gear, the transmission is in neutral, with each of the driven gears being maintained in free-wheeling relation to the output shaft.

The subject invention comprises a novel arrangement for inducing selected sliding movement of the shift forks with respect to the guide rail for effecting selection of the desired transmission gear ratio. Each of the shift forks is provided with a pair of drive lugs disposed in upstanding relation to that portion of the shift fork slidably disposed upon the guide rail. Each of the drive lugs defines a support slot or hole within which is rotatably supported an elongated gear ratio selection drive screw. The drive screw extends generally parallel to the guide rail, and includes a threaded portion at each end thereof. In the preferred embodiment, the drive screw includes a right hand threaded portion at one end thereof, and a left hand threaded portion at the other end. The drive screw is carried by the support holes of the shift forks such that the right-hand threaded portion is disposed within the support holes of one of the shift forks, and the left-hand threaded portion is disposed within the support holes of the other shift fork.

In order to convert rotation of the drive screw into sliding movement of the shift forks along the guide rail, a threaded drive element or nut is carried by each of the threaded portions of the drive screw, each nut being spaced upon the drive screw such that it is disposed between the two drive lugs of one of the shift forks. A biasing drive spring is disposed between each face of each of the drive nuts and a respective inner surface of one of the drive lugs. The positioning of each of the drive nuts relative to its respective shift fork is such that the nut engages or abuts an adjacent surface of the shift fork and is prevented from rotating with respect thereto. In this way, it will be seen that rotation of the drive screw induces axial displacement of the drive nut along the drive screw. This displacement acts against one of the drive springs, which in turn exerts force against a respective drive lug of the shift fork. Thus, the rotational movement of the drive screw is converted to a linear displacement which acts upon the shift fork to move it along the guide rail. Depending on the direction of rotation of the drive screw, linear displacement of the shift fork may be induced in either direction. Although various arrangements may be used for inducing selective rotation of the drive screw, the preferred embodiment of the subject invention contemplates the use of a suitable motor driven worm drive. A worm driven gear is splined or keyed to a central portion of the drive screw, and is driven by means of a motor powered worm driver. Suitably reversible motor means are provided such that the drive screw may be rotated in either direction.

In a transmission as herein described, selection of the appropriate gear ratio is made possible by the engagement of one of the dog clutches of one of the gear couplings with the driven gear of the gear pair having the desired gear ratio, while the other dog clutches are maintained out of engagement with their respective driven gears. In accordance therewith, the subject invention further provides means for selectively locking the shift forks on the guide rail. Specifically, a solenoid activated plunger is provided on each of the shift forks. The plunger is in registration with a suitable notch or groove in the guide rail, and normally extends therein preventing movement of the shift fork axially on the guide rail. When the solenoid is activated, the plunger is withdrawn from the guide rail notch, and relative movement of the shift fork to the guide rail is possible. Thus, it will be seen that by selective activation of one of the shift fork solenoids, and rotation of the drive screw in the appropriate direction, one of the shift forks will be caused to move axially on the guide rail, thereby moving its respective gear coupling into engagement with the driven gear of the gear pair having the desired gear ratio. The drive screw is rotated by the worm drive in one direction or the other, with both of the drive nuts being moved inwardly or outwardly of the drive screw in unison. Simultaneously, the solenoid of one of the plungers on one of the shift forks is activated, thereby withdrawing the plunger of that shift fork from its respective guide rail notch. Axial movement of that shift fork with respect to the guide rail is then possible. As the drive nuts move axially with respect to the drive screw as it rotates, the drive nut associated with the shift fork whose plunger has been disengaged from the guide rail, will act against one of the drive springs which in turn acts against one of the drive lugs of the shift fork to move the shift fork axially with respect to the guide rail, the shift fork axially moving its respective gear coupling along the input shaft until power-transmitting engagement between the gear coupling and the selected gear driver is effected. Thus, engagement of the desired gear ratio has been made. Because the plunger of the other shift fork has not been disengaged from the guide rail during the gear selection sequence, it is maintained in a neutral condition, with its respective gear coupling rotating with the output shaft out of engagement with either of its respective driven gears. Even though the drive nut associated with the non-activated shift fork moves relative to the shift fork as it is displaced axially of the drive screw, this axial displacement is effectively "lost" or absorbed by the drive springs disposed on opposite sides of the drive nut. Thus, it will be observed that selective disengagement of the plunger of one of the shift forks, together with selected rotation of the drive screw in one direction or the other, provides an arrangement whereby the shift forks may be displaced to move the output shaft gear couplings for engagement of any one of the four gear ratios of the transmission.

In order to effectuate shifting or gear selection of the transmission disclosed herein, the subject invention provides an electrical control system which receives input from various sensors and detectors in the system, and provides output to the screw drive motor and the shift fork plunger solenoids. Each shift fork is provided with an associated position detector, for relaying shift fork position data to a switching matrix circuit. Data input is also received from a safety interlock receiving information from a clutch position sensor, thereby preventing shifting of the transmission unless the clutch is disengaged. Similarly, the transmission is provided with a speed sensor or counter for preventing gear shifting above predetermined engine or output shaft speeds. The operator is provided with a switching control connected with the switching matrix such that the desired gear ratio is selected by the operator, with the switching matrix affecting engagement or disengagement of the appropriate shift fork plunger solenoid, and rotation of the drive screw in the appropriate direction in order to engage the gear ratio desired.

DESCRIPTION OF THE PREFERRED EMBODIMENT

Figure 1:
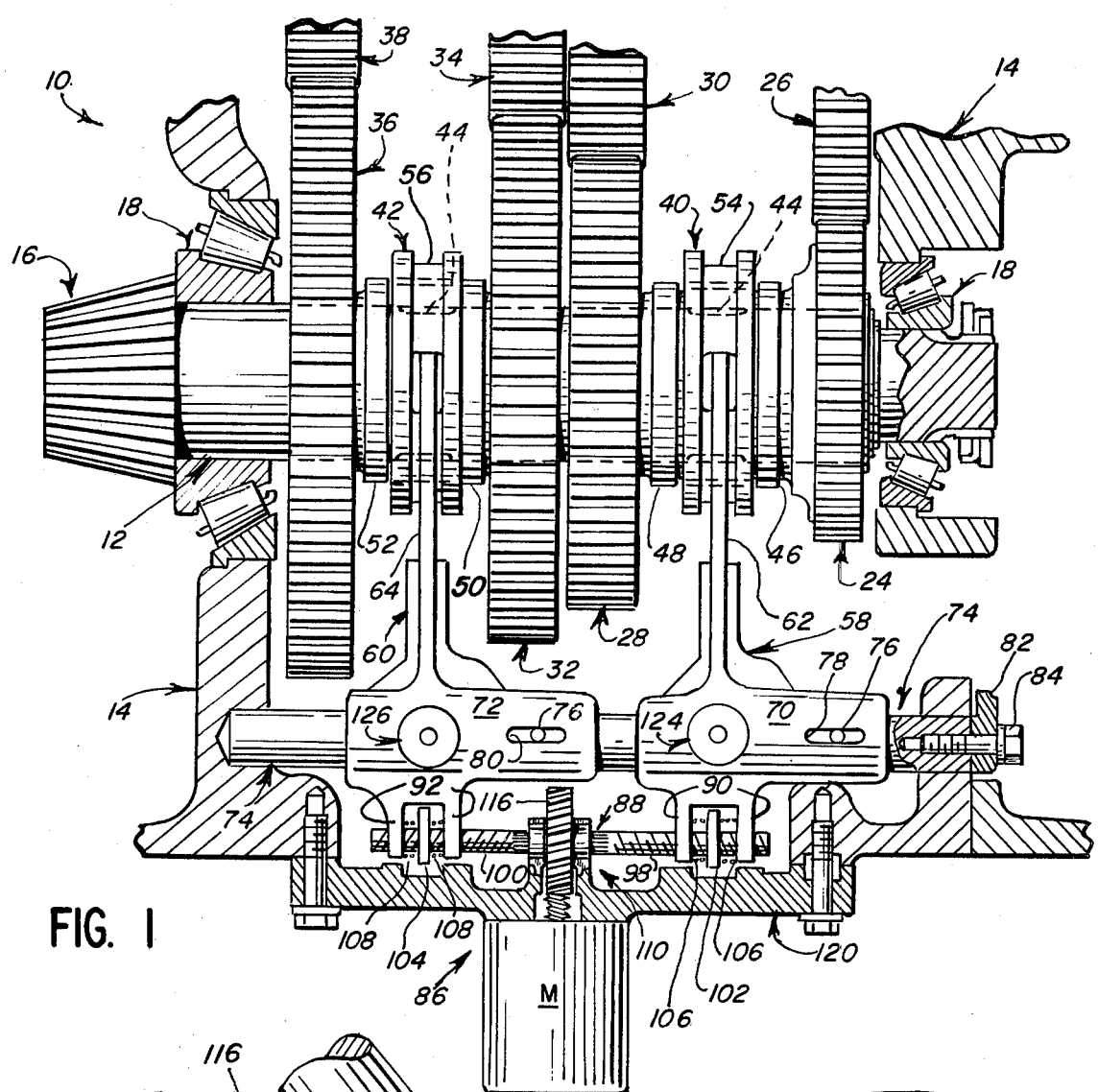
FIG. 1 is a fragmentary plan view of a constant mesh transmission including the gear ratio selection arrangement of the present invention.

While the subject invention is susceptible to embodiment in different forms, there is shown in the drawings and will hereinafter be described a preferred embodiment with the understanding that the present disclosure is to be considered as an exemplification of the principles of the invention and is not intended to limit the invention to the embodiment illustrated.

Figure 5:
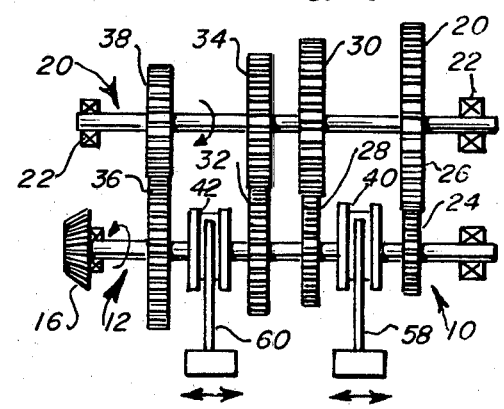
FIG. 5 is a diagrammatic view of the transmission for which the gear ratio selection mechanism of the present invention provides selective gear shifting.

Referring now to FIGS. 1 and 5, therein is disclosed a multi-speed, constant-mesh transmission 10. The transmission includes a power input shaft 20 which receives power from the primary drive train. A transmission housing 14 is suitably provided for encompassing the transmission and typically may include lubricants disposed therein for effecting the lubrication of the various transmission elements. The input shaft 20 is suitably supported by the transmission housing on bearing assemblies 22. The transmission 10 further includes an output shaft 12 disposed in parallel relation to the input shaft 20. The output shaft 12 is mounted in transmission housing 14 on bearing assemblies 18 and includes an output gear 16 which provides power to the final drive train of the piece of equipment. The multiple gear ratios of the transmission are provided by a plurality of driver and driven gear pairs disposed in spaced relation along the input shaft 20 and the output shaft 12. As is typically the case with a constant mesh transmission, the driver gears of each pair are disposed in spaced relation on the input shaft 20 of the transmission, while the driven gears of each gear pair are disposed in spaced relation along the output shaft 12 of the transmission. Each of the driver gears of the gear pairs is always in engagement with its respective driven gear, or in "constant mesh." In the transmission of the present disclosure, each of the driver gears is keyed or splined to the input shaft 20 for rotation therewith. In contrast, each of the driven gears of the gear pairs are rotatably supported upon the output shaft 12, or are "free-wheeling"

thereon. Thus, effectuation of the desired gear ratio is made by selectively coupling one of the driven gears to the output shaft thereby delivering power to the output shaft through that particular gear pair. The driver and driven gears of each gear pair are of varying relative size so as to provide the varying degrees of relative mechanical advantage between the input shaft 20 and the output shaft 12.

Accordingly, the transmission 10 is provided with a first gear driver 38 on the input shaft 20 and a first driven gear 36 rotatably supported on the output shaft 12 for rotation therewith. Similarly, second driver and driven gears 34 and 32, third driver and driven gears 30 and 28, and fourth driver and driven gears 26 and 24 are respectively disposed on the input shaft 20 and the output shaft 12. Thus, the transmission 10 is provided with multiple speeds, in this case four different gear ratios.

In order to effect the selective coupling of one of the drivers with the output shaft 12 for power transmission therethrough, the transmission includes a pair of gear couplings disposed upon the output shaft 12. First-/second gear coupling 42 is disposed between first driven gear 36 and second driven gear 32. Similarly, third/fourth gear coupling 40 is disposed between third driven gear 28 and fourth driven gear 24. In order to effectively transmit power to the output shaft 12 from each of the gear couplings 40 and 42, the shaft 12 and the couplings 40 and 42 are each provided with suitable splines 44. It will be understood by those skilled in the art that a suitable keyway and key could alternately be provided for effecting power-transmitting engagement between the output shaft 12 and the gear couplings 40 and 42. The splines 44 are disposed in such a fashion that the gear couplings 40 and 42 may be moved axially of the output shaft 12, but will always ensure that the gear couplings 40 and 42 rotate in unison with the output shaft 12.

In order to effect selected power transmission to one of the gear couplings 40 or 42 from one of the driven gears of the transmission gear pairs, each of the gear couplings 40 and 42 is provided with a pair of typical dog clutches disposed on axially opposite ends thereof. Each dog clutch is adapted to provide power-transmitting engagement of the respective gear coupling with a respective driven gear. Thus, gear coupling 42 includes first and second dog clutches 52 and 50 adapted to engage and transmit power from first driven gear 36 and second driven gear 32, respectively. Similarly, the gear coupling 42 includes third and fourth dog clutches 48 and 46, adapted to engage and transmit power from third driven gear 28 and fourth driven gear 24, respectively. Thus, it will be observed that by selective movement of one of the gear couplings 40 or 42 into engagement with one of the driven gears, power received by the input shaft 20 is selectively transmitted through any one of driver gears 38, 34, 30 and 26 to its respective driven gear 36, 32, 28, and 24, which in turn transmits the power through one of the dog clutches of gear couplings 42 and 40, which by virtue of splines 44 transmits the power to output shaft 12. The power is then transmitted to the final drive train.

In order to effect the axial displacement of each of the gear couplings 40 and 42 along the output shaft 12, each gear coupling 40 and 42 includes an annular recess or shift fork channel 54 and 56, respectively. Each gear coupling is provided with an associated shift fork mechanism for axially displacing the gear coupling with respect to the output shaft 12. Thus, gear coupling 40 is provided with a third/fourth gear shift fork 58 having a pair of bifurcated fork portions 62 having a generally C-shaped configuration. Each fork portion 62 includes a channel foot portion 66 at the end thereof, the shift fork 58 being disposed with respect to the gear coupling 40 such that the foot portions 66 fit within the annular channel 54 with the fork portions 62 essentially spanning the gear coupling 40. Similarly, gear coupling 42 is provided with a first/second gear shift fork 60 which includes fork portions 64 disposed in a C-shaped configuration, and each including a channel foot portion at the end thereof disposed within the annular channel 56 of the gear coupling 42. In the preferred embodiment, the distance between the foot portions of the respective shift forks 58 and 60 will be slightly greater than the diameter of the of the respective gear shift channels 54 and 56. Similarly, the width of the foot portions is slightly less than the width of the respective shift fork channels 54 and 56. In this way, gear couplings 40 and 42 are able to rotate freely relative to the shift forks 58 and 60.

In order to maintain shift forks 58 and 60 in generally perpendicular relationship to the input shaft 12, each of the shift forks includes a shift fork sleeve portion 70 and 72, respectively, slidably supported by a shift fork guide rail 74 for axial movement with respect thereto. The shift fork guide rail 74 is disposed in generally parallel relation to the output shaft 12 and the input shaft 20, and includes a pair of guide rail pins 76 each of which is positioned so as to be disposed within a guide rail pin slot 78 and 80 defined by respective shift fork sleeve portions 70 and 72. It will be readily observed that this configuration enables the shift forks 58 and 60 to be shifted axially of the guide rail 74, while preventing rotation with respect thereto. The guide rail 74 is held in fixed relation relative to the transmission housing 14 by a guide rail bracket 82 and an eccentrically positioned guide rail fastener 84. By limiting the relative rotation of the shift forks 58 and 60 about the guide rail 74, there is a minimum of contact between the foot portions of the shift forks and the respective recessed portion of the shift fork channels 54 and 56.

It will be appreciated that selective axial displacement of one of the shift forks 58 and 60 along the guide shaft 74 acts through the bifurcated fork portions of the shift fork to exert pressure axially with respect to the output shaft 12 on one of the gear couplings 40 and 42, thereby moving that gear coupling into engagement with one of the driven gears and thereby providing engagement of that gear pair. In order to effect selected displacement of the shift forks 58 and 60, the subject invention provides a novel gear selection system indicated generally by 86. The gear selection system 86 includes a gear ratio selection drive screw 88 extending generally parallel to the guide rail 74.

Figure 2:
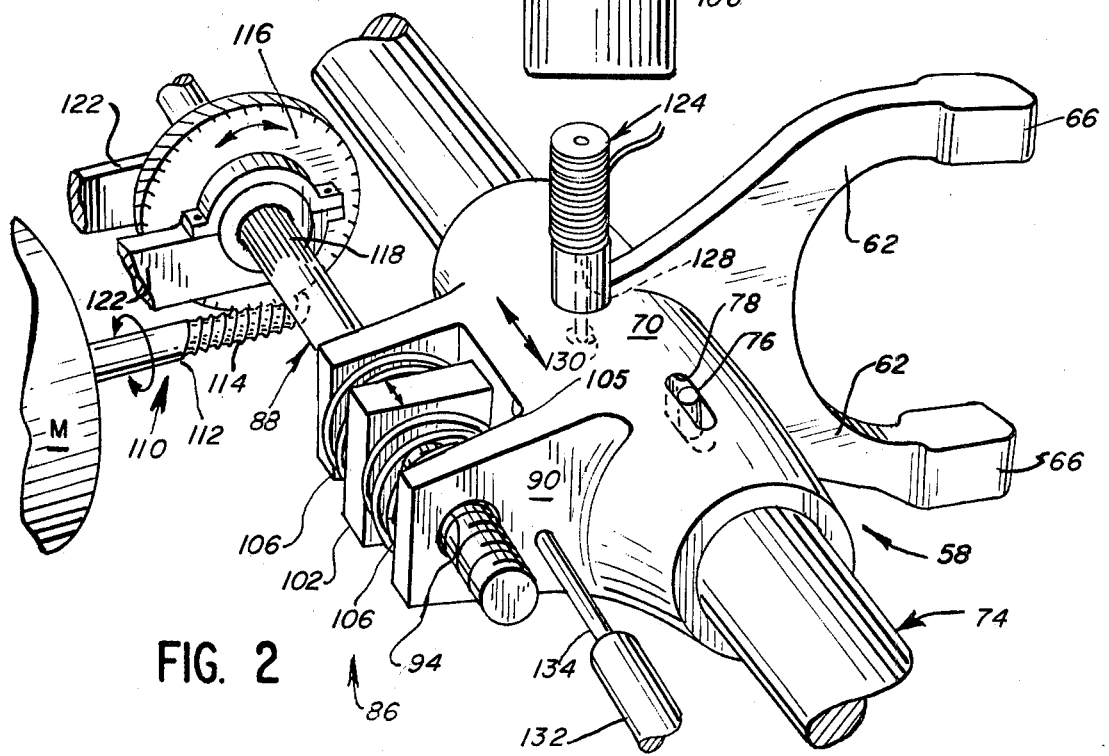
FIG. 2 is a fragmentary perspective view of a portion of the gear ratio selective mechanism shown in FIG. 1.

With reference to FIGS. 1 and 2, each of the shift forks 58 and 60 include a pair of spaced shift fork drive lugs 90, 90 and 92, 92 respectively, disposed in upstanding relation to the respective sleeve portions 70 and 72. As best seen in FIG. 2, drive lugs 90 defines a drive screw support hole 94 within which the drive screw 88 is rotatably supported. Similarly, the drive lugs 92, 92 of the shift fork 60 define corresponding support holes. It will be appreciated that drive screw 88 could be similarly supported by slots in the drive lugs or other suitable cavities.

The drive screw 88 has a threaded screw portion 98 at one end thereof which includes right-handed screw threads, and further includes a threaded screw portion 100 at the opposite end thereof which is threaded with left-hand screw threads. A right-hand drive element or nut 102 is threaded upon and carried by the threaded portion 98, and a left-hand drive element or nut 104 is carried by the screw portion 100. Because it is necessary that rotation of the drive nuts 102 and 104 relative to the shift forks 58 and 60 be prevented, each drive nut engages or abuts a portion of its respective shift fork 58 and 60, thereby preventing relative rotation therebetween. This is best seen in FIG. 2 where drive nut 102 is shown as having a generally square configuration, with one of its faces abutting a flat portion 105 of the shift fork 58. The gear selection system 86 further includes two pairs of biasing drive springs 106 and 108. These springs are carried by the drive screw 88, with each pair being respectively disposed on opposite sides of drive nuts 102 and 104, and held captive between the drive nut and one of the drive lugs 90 and 92. Thus, it will be readily observed that an axial displacement of the drive nuts 102 and 104 along the drive screw 88 results in pressure being placed upon the drive springs 108 and 110, which in turn exert pressure upon the respective drive lugs 90 and 92. This pressure upon the drive lugs 90 and 92 acts to displace the shift forks 58 and 60 axially of the guide rail 74, as hereinafter will be described.

Rotation of the drive screw 88 is provided by drive screw actuator 110. The screw actuator 110 includes a drive motor M, which in the preferred embodiment is electrically powered, having a motor output shaft 112. The motor output shaft 112 includes a worm driver gear portion 114 which engages and drives a worm driven gear 116 carried by drive screw 88, adapted to rotate therewith by way of drive screw splines 118. It will be noted that drive screw 88 may move axially with respect to the worm driven gear 116, the purpose of which will be later discussed. As shown in FIG. 1, an access plate 120 is suitably fastened to the transmission housing 14 for facilitating assembly and maintenance of the transmission. The access plate 120 provides a suitable mounting for the drive motor M, and further provides a pair of upstanding worm gear bearing supports 122 disposed on opposite sides of the worm driven gear 116, thereby maintaining the driven gear 116 in its proper relation to the worm driver 114.

In order to effectuate selective motion of the shift forks 58 and 60, each shift fork is provided with a shift fork lock solenoid 124 and 126, each being preferably electrically actuated. As best shown in FIG. 2, the shift fork lock solenoid 124 includes a solenoid plunger portion 128 (shown in phantom) which is in registration with and extends into an appropriate notch portion 130 in the guide rail 74. It will be appreciated that in its neutral, non-activated position, the solenoid plunger 128 extends into and engages the guide rail notch portion 130, preventing relative axial movement of the shift fork 58 on the guide rail 74. Actuation of the lock solenoid 124 by suitable electrical means acts to withdraw the plunger 128 from the notch portion 130, thereby permitting relative axial movement of the shift fork 58 on the guide rail 74. It will be understood that although FIG. 2 illustrates this arrangement for shift fork 58 only, a similar lock solenoid 126 including a solenoid plunger portion is provided on shift fork 60 in registration with and for engagement in a similar notch portion in the guide rail 74.

Figure 3:
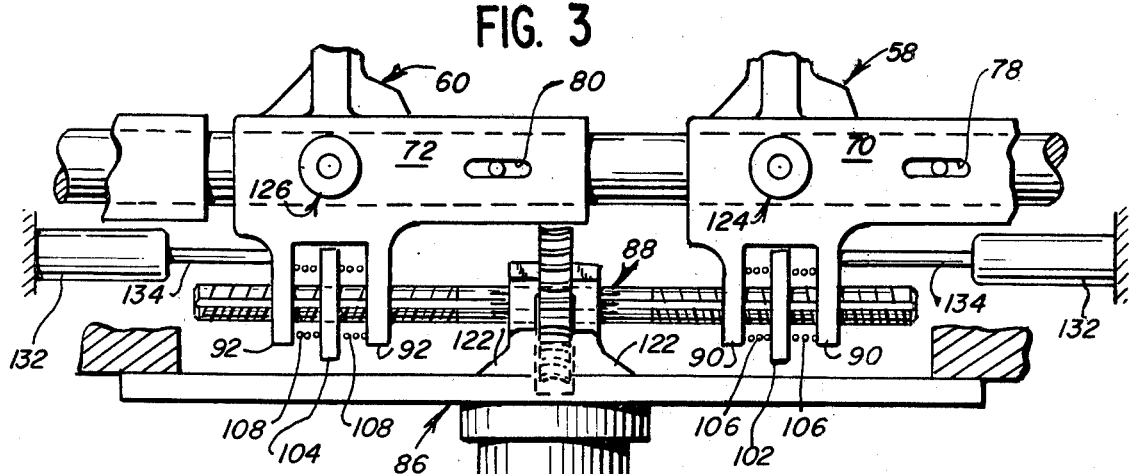
FIG. 3 is a fragmentary plan view of the gear ratio selection mechanism shown in FIG. 1.

With reference now to FIG. 3, the gear selection system 86 of the present invention is shown wherein the shift forks 58 and 60 are disposed in a neutral gear selection mode. In order to provide the necessary information to the gear selection control system regarding the positioning of each of the shift forks 58 and 60, the gear selection system 86 includes a pair of position detectors 132, each including a plunger portion 134 which is in contact with and follows the movement of one of the shift forks 58 and 60. Each of the position detectors 132 provides an electrical feedback signal which is directed to the switching matrix of the control system to provide integrated function of the gear selection system.

Figure 4:
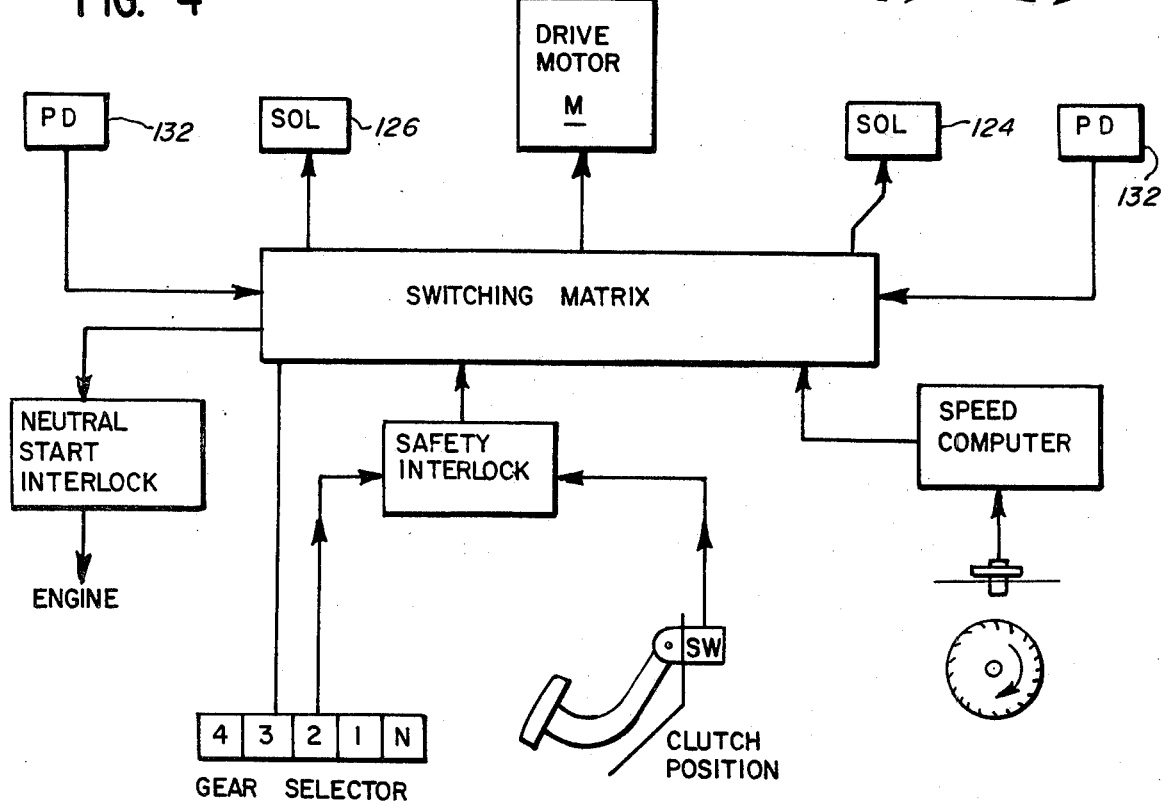
FIG. 4 is a diagram of the logic circuit provided for operating the gear ratio selection mechanism of the subject invention.

FIG. 4 illustrates diagramatically the electrical control system of the subject invention. The control system includes a switching matrix which receives input from various sensors and detectors in the control system, and provides input to the shift fork lock solenoids 124 and 126, and directs the actuation of the drive motor M which rotates the drive screw 88. A gear selector is provided in the operator's control area where the choice of the desired gear ratio can be made by the operator. A safety interlock is provided between the gear selector and a position detector operatively associated with the primary drive train clutch, the safety interlock preventing gear change when the clutch is not in a neutral or disengaged position. A speed counter is also provided for monitoring the speed of the engine or output shaft 12, and acts to prevent gear change unless the output of the transmission is at or below a preselected speed, thus preventing damage to the transmission unit. The switching matrix also provides a signal to a neutral start interlock, which prevents the engine from being started unless the transmission is in the neutral position.

In order to provide the proper sequence of events for making the desired gear selection, the switching matrix receives signals from each of the position detectors 132, the signal reflecting the position of each of the shift forks 58 and 60. Inputs to the switching matrix from the position detectors, the speed counter, the safety interlock, and the gear selector are integrated by the switching matrix to selectively activate one or both of the lock solenoids 124 and 126, as well as directing the drive motor M to drive the drive screw 88 in the desired direction of rotation. The necessary logic circuits of the switching matrix are conventional in design and will be well understood by those familiar with the art.

OPERATION

The integrated operation of the above-described components will now be discussed. The operator of the equipment starts the engine, after first checking to determine that the transmission is in neutral so that the neutral start interlock does not prevent the engine from being started. The speed counter monitors the speed of the output from the transmission and prevents gear ratio selection unless the output is at or below a predetermined speed. If it is assumed that the operator wishes to engage the first, or lowest, speed in the gear box, the following sequence of events will take place. After first disengaging the clutch so as to release the safety interlock between the gear selector and the switching matrix, the operator selects the desired gear ratio (in this case first) by operating the appropriate control of the gear selector. This command is fed into the switching matrix, which is receiving inputs from each of the position detectors 132 indicating that the shift forks 58 and 60 are each in a neutral or disengaged position. Because engagement of the first gear ratio requires movement of shift fork 60 only, the switching matrix activates solenoid 126, causing the solenoid plunger of shift fork 60 to be withdrawn from the guide rail 74. Movement of shift fork 60 axially of guide rail 74 is now possible. The solenoid 124 of shift fork 58 has not been activated, and therefore shift fork 58 is prevented from moving axially with respect to guide rail 74.

Referring to the orientation of FIG. 1, shift fork 60 must move to the left on guide rail 74 in order to slide gear coupling 42 axially on the output shaft 12 so that it is brought into power-transmitting engagement with driven gear 36 of the gear pair having the first (or lowest) gear ratio of the transmission. Since shift fork 60 must move to the left in order to engage gear coupling 42 with first gear driven 36, it will be observed that drive nut 104 carried by the drive screw 88 must move to the left in order to so move the shift fork 60. Thus, drive screw 88 must be rotated in a clockwise direction (when viewed as in FIG. 2) in order to shift drive nut 104 and shift fork 60 to the left. After signaling shift fork solenoid 126 to withdraw its plunger from the guide rail 74, the switching matrix signals the drive motor M to drive worm driven gear 116 such that drive screw 88 is rotated in the desired direction. As drive screw 88 rotates, drive nut 104 moves outwardly of the central portion thereof, the drive nut 104 abutting a portion of the shift fork 60 to prevent the drive nut from rotating with the drive screw 88. As the drive nut 104 moves axially of the drive screw 88, it pushes against biasing drive spring 108 disposed between the drive nut 104 and one of the drive lugs 92 of the shift fork 60. As drive nut 104 continues to move outwardly of the drive screw 88, shift fork 60 is moved axially of the guide rail 74, and thereby moves gear coupling 42 axially of the output shaft 12. The switching matrix operates drive motor M for a sufficient period of time such that gear coupling 42 is moved toward driven gear 36 until the dog clutch 52 engages the driven 36 in power-transmitting relationship. The operator now releases the clutch pedal to engage the clutch to connect the drive shaft of the engine with the output shaft 12 of the transmission. The power is transmitted from the input shaft 20 through driver and driven gears 38 and 36, through dog clutch 52 to coupling 42, and through splines 44 to output shaft 12, which is connected through output gear 16 to the final drive train. Thus, it will be observed that the selection of the desired gear ratio has been made by the operator in a simple and efficient way without the manipulation of manual transmission shifting arrangements by the operator.

During the gear selection sequence, position detectors 132 monitor the positions of shift forks 58 and 60. Because the dog portions of the dog clutches associated with each of the gear couplings 40 and 42 may not be in alignment with the associated engagement portions on the driven gears at the moment that the gear coupling is moved into position for engagement with one of the driven gears, the switching matrix provides the drive motor M with a steady output signal for a period of time long enough to move the shift fork into the desired gear selection position under proper alignment conditions. After this period of time, full voltage will be fed to the drive motor M by the switching matrix in pulses to provide an actuating force without motor winding burnout. In addition, if the proper alignment conditions do not exist as the shift fork is being moved axially of the guide rail 74, the drive nut 104 compresses the biasing spring 108 against which it has been exerting force to move the shift fork axially. In this way, the shift fork is effectively biased or "spring-loaded" with the biasing spring 108 urging the shift fork and consequently the gear coupling into engagement with the selected driven gear when the proper alignment conditions occur.

With further reference to FIGS. 1 and 2, and to the actuation of the first gear ratio in the transmission, the solenoid 124 on the shift fork 58 has remained in a deactivated state. Thus, shift fork 58 has been prevented from moving axially with respect to guide rail 74 since the plunger portion of the solenoid 124 has remained in engagement with the shift rail. However, because the drive screw 88 acts to axially displace both drive nuts 102 and 104 during its rotation, drive nut 102 is quickly moved against one of its respective biasing drive springs 106 which in turn is abutting one of the drive lugs 90 of the shift fork 58. Since drive nut 102 can no longer be displaced it is necessary for the continued rotation of the drive screw 88 to be provided for without jamming of the mechanism. For this reason, the worm driven gear 116 is splined or keyed to the drive screw 88 for relative axial movement thereto. Thus, as drive nut 102 abuts against drive spring 106 the drive screw 88 may be shifted axially with respect to the worm driven gear 116 as its rotation for the selection of the desired gear ratio is completed. Worm gear bearing support 122 on the access plate 120 engage the worm gear 116 to prevent it from being moved out of position relative to the worm driver 114. As the above-described sequence of events is reversed for disengaging the first gear ratio, the drive screw 88 again may shift axially relative to the worm gear 116 so that they are in the same relative position whenever the transmission is moved through its neutral position.

With further reference to the above illustration, the operation of the gear selection system will be described in shifting the transmission from the first gear ratio to the second. The operator first disengages the clutch pedal, with the safety interlock of the control system then permitting input from the gear selector to be entered into the switching matrix. The speed counter monitors the transmission output speeds so that shifts are made at or below the predetermined speeds. The operator then activates the gear selector so that the control system operates to engage the second gear ratio. The switching matrix activates the drive motor M to turn the drive screw 88 in a counterclockwise direction, as viewed in FIG. 2. The lock solenoid 124 remains in a deactivated state such that shift fork 58 is held in its neutral position with respect to the guide rail 74. As the drive screw 88 rotates in a counterclockwise direction, drive nut 104 is displaced axially along the drive screw 88 toward its central portion. The drive nut 104 reacts against the other drive spring 108, which in turn pushes against the drive lug 92 of the shift fork 60 which is disposed toward the central portion of the drive screw 88. The shift fork 60 is displaced axially of the guide rail 74 (to the right with the orientation shown in FIG. 1) so that gear coupling 42 is moved axially of output shaft 12 thereby disengaging dog clutch 52 from first driven gear 36.

As the drive motor M continues to rotate the drive screw 88, shift fork 60 and gear coupling 42 are moved through their neutral positions (i.e., the dog clutches of coupling 42 being out of engagement with either of the driven gears 36 or 32) and dog clutch 50 of the gear coupling 42 is moved into power-transmitting engagement with the second driven gear 32 of the second gear ratio pair. If the proper alignment does not exist at the moment that dog clutch 50 is moved against the second driven gear 32, the drive spring 108 is compressed by the drive nut 104 so that the shift fork 60 is again in a spring-loaded condition so that dog clutch 50 may be brought into power-transmitting engagement with the second driven gear 32 as soon as the proper alignment conditions exist.

During the above-described shifting between the first and second gear ratios, the other shift fork 58 has remained in its neutral position with respect to the guide rail 74 since the lock solenoid 124 has not been activated, and its plunger is still in engagement with the guide rail 74. Because a displacing force is generated at drive nut 102 associated with the shift fork 58, the splined mounting of worm gear 116 on the drive screw 88 again prevents the mechanism from jamming or binding by allowing the drive screw 88 to shift axially with respect to the worm gear 116. The position detectors 132 provide feedback to the switching matrix of the control system so that the commands for the proper duration of time are delivered by the switching matrix to the drive motor M and the lock solenoids 124 and 126.

In order to shift the transmission of the present invention from the second to the third gear ratio, the switching matrix would provide the following control function. After disengaging the clutch and ensuring that the transmission input is at or below the predetermined maximum speed for shifting, the operator would activate the gear selector switch in the control area to select the third gear ratio. The switching matrix would then activate the drive motor M to rotate the drive screw 88 such that shift fork 66 and gear coupling 42 are moved to the left (as viewed in FIG. 1) until dog clutch 50 is disengaged from the second driven gear 32, and gear coupling 42 is again moved to its neutral or disengaged position. The switching matrix, while receiving position input data from the position detector 132, would then stop the rotation of the drive screw 88 and deactivate the lock solenoid 126, causing its plunger to again engage the guide rail 74 thereby preventing further axial movement of shift fork 60 relative thereto. The switching matrix would then activate the lock solenoid 124 of shift fork 58, and signal the motor M to rotate the drive screw 88 such that shift fork 58 is moved axially on the guide rail 74 until the dog clutch 48 of the gear coupling 40 is brought into power-transmitting engagement with the third driven gear 28.

It will be appreciated that in order to shift the transmission 10 from its third gear ratio, to its fourth, the sequence of events is essentially the same as described for the shifting from the first gear ratio to the second, except that the lock solenoid 126 of the shift fork 60 is deactivated so that the shift fork 60 cannot move axially with respect to the guide rail 74, while the solenoid 124 of the shift fork 58 is activated so that its plunger is drawn out of engagement with the shift rail 74 so that the shift fork 58 may be displaced axially with respect thereto. Further, should the operator wish to shift the transmission into neutral, the proper input at the gear selector in the control area will cause the switching matrix to signal the drive motor M to rotate the drive screw 88 to return the shift forks to their neutral positions, and to deactivate both of the lock solenoids 124 and 126 so that the shift forks 58 and 60 maintain their respective gear couplings 40 and 42 in a neutral disposition with respect to the driven gears carried by the output shaft 12. Thus, the subject invention provides a novel arrangement providing gear ratio selection in a transmission with a simple, and smoothly operating arrangement which may be easily manipulated by the operator with a minimum of physical effort and resultant fatigue.

Although the subject invention has been described in the environment of a four-speed, constant mesh transmission, it will be well understood by those familiar with the art that the principles disclosed herein would be equally applicable to a transmission having some other configuration. For instance, some transmissions include arrangements whereby shift forks displace driver or driven gears into and out of engagement with their associated meshing gear. It will be readily understood that the motor driven gear selector mechanism of the subject invention would be equally applicable for use in such a transmission arrangement, as well as in transmissions having other types of configurations. Additionally, although the subject invention has been disclosed in conjunction with a four-speed ratio gear box, its use could be easily achieved with a gear box or transmission having fewer or greater speed ratios by providing a mechanism for making fewer gear ratio selections, or by a duplication of certain elements of the invention so that gear selection of additional speed ratios could be made.

From the foregoing, it will be observed that numerous variations and modifications may be effected without departing from the true spirit and scope of the novel concept of the subject invention. It will be understood that no limitation with respect to the specific apparatus illustrated herein is intended or should be inferred. It is, of course, intended to cover by the appended claims all such modifications as fall within the scope of the claims.

What is claimed is:

1. For a transmission including input and output shafts and gear coupling means movable axially of said output shaft between a first neutral non-power-transmitting position and a second power-transmitting position wherein power is transmitted from said input shaft to said output shaft, a gear shifting arrangement for moving said coupling means between said first and second positions comprising:
   shift fork means engageable with said coupling means and displaceable generally parallel to said output shaft for moving said coupling means axially thereof,
   rotatable shaft means including a threaded portion disposed adjacent to said fork means,
   motor means for selectively rotating said shaft means, and
   drive means including a drive element which is displaced axially with respect to said shaft means threaded portion during rotation thereof for operatively connecting said shaft means with said fork means, whereby selective rotation of said shaft means by said motor means in one direction displaces said fork means to move said coupling means from said first position toward said second position, and rotation of said shaft means in the other direction displaces said fork to move said coupling means from said second position toward said first position.

2. For a transmission including input and output shafts and gear coupling means movable axially of said output shaft between a first neutral non-power-transmitting position and a second power-transmitting position wherein power is transmitted from said input shaft to said output shaft, a gear shifting arrangement for moving said coupling means between said first and second positions comprising:

shift fork means including lug means comprising a pair of upstanding drive lugs between which said drive element is disposed and against which said drive element reacts to displace said shift fork means engageable with said coupling means and displaceable generally parallel to said output shaft for moving said coupling means axially thereof, rotatable shaft means disposed adjacent to said fork means, motor means for selectively rotating said shaft means, and drive means including a drive element which is displaced axially with respect to said shaft means during rotation thereof for operatively connecting said shaft means with said fork means, whereby selective rotation of said shaft means by said motor means in one direction displaces said fork means to move said coupling means from said first position toward said second position, and rotation of said shaft means in the other direction displaces said fork to move said coupling means from said second position toward said first position.

3. For a transmission including input and output shafts and gear coupling means movable axially of said output shaft between a first neutral non-power-transmitting position and a second power-transmitting position wherein power is transmitted from said input shaft to said output shaft, a gear shifting arrangement for moving said coupling means between said first and second positions comprising:

shift fork means engageable with said coupling means and displaceable generally parallel to said output shaft for moving said coupling means axially thereof, rotatable shaft means disposed adjacent to said fork means, motor means for selectively rotating said shaft means, gear means for transmitting movement of said motor means into rotation of said shaft means, means accommodating axial displacement of said shaft means with respect to said gear means, and gear support means limiting axial movement of said gear means, and drive means including a drive element which is displaced axially with respect to said shaft means during rotation thereof for operatively connecting said shaft means with said fork means, whereby selective rotation of said shaft means by said motor means in one direction displaces said fork means to move said coupling means to move said coupling means from said first position toward said second position, and rotation of said shaft means in the other direction displaces said fork to move said coupling means from said second position toward said first position.

4. The gear shifting arrangement as recited in claim 2, wherein said shaft means includes a threaded portion upon which said drive element is carried and axially movable with respect to.

5. The gear shifting arrangement as recited in claim 4, said drive means further includes a pair of drive biasing elements each disposed between a respective side of said drive element and one of said drive lugs.

6. The gear shifting arrangement as recited in claim 4, wherein a portion of said drive element is in abutting relation with a portion of said fork means thereby preventing relative rotation therebetween.

7. The gear shifting arrangement as recited in claim 1 or 5, and guide means extending generally parallel to said input shaft upon which said shaft fork means is movably supported for axial displacement with respect thereto.

8. The gear shifting arrangement as recited in claim 7, and pin means for preventing rotation of said fork means relative to said guide means.

9. The gear shifting arrangement as recited in claim 7, and selectively operable shift fork lock means having a deactivated mode wherein displacement of said shift fork means axially of said guide means is prevented, and an activated mode wherein axial displacement of said fork means relative to said guide means can be effected.

10. The gear shifting arrangement as recited in claim 9, and a gear shifting control system including a manually operable gear selector, and a switching matrix operatively connected with said gear selector, said motor means and said shift fork lock means whereby operation of said gear selector to select power transmission from said input shaft to said output shaft provides a signal to said switching matrix which provides a signal to said fork lock means for effecting its activated mode, and a signal to said motor means for activation thereof for effecting rotation of said shaft means for moving said coupling means relative to the output shaft between its first and second positions.

11. The gear shifting arrangement as recited in claim 10, and speed counter means operatively connected with said switching matrix for monitoring the speed of said output shaft and preventing activation of said motor means when said output shaft is above a predetermined speed.

12. The gear shifting arrangement as recited in claim 10, and clutch sensor means operatively connected with said switching matrix whereby activation of said motor means is prevented when a power-transmitting clutch disposed in a primary drive train is engaged.

13. The gear shifting arrangement as recited in claim 10, and shift fork position detector means operatively connected with said switching matrix and adapted to detect the relative position of said shift fork means whereby signals from said switching matrix to said motor means for the activation thereof are provided for the proper duration of time to effect the desired displacement of said shift fork means.

14. In a transmission including input and output shafts, a plurality of gear pairs respectively disposed along said input and output shafts wherein each gear pair provides a power-transmitting gear ratio, and first and second gear coupling means movable axially of said output shaft, each gear coupling being movable between a neutral non-power-transmitting position and at least one power-transmitting position wherein power is transmitted from said input shaft to said output shaft through one of said gear pairs, a gear-shifting arrangement for selectively moving said first and second gear coupling means comprising:

first and second shift fork means respectively engageable with said first and second gear couplings and axially displaceable with respect to said input shaft, rotatable shaft means disposed generally parallel to said input shaft, motor means operatively connected with said shaft means for selective rotation thereof, first and second drive means for operatively connecting said shaft means with said first and second shift fork means, respectively, for urging the displacement of said first and second shift fork means when said shaft means is rotated by said motor means, and control means for selectively activating said motor means to rotate said shaft means and for selectively preventing displacement of said first and second shift fork means.

15. The gear shifting arrangement as recited in claim 14, wherein
rotation of said shaft means in one direction urges displacement of each of said first and second shift fork means respectively in one direction and rotation of said shaft means in the other direction urges displacement of each of said first and second fork means respective in another direction.

16. The gear shifting arrangement as recited in claim 15, wherein
rotation of said shaft means in said one direction urges displacement of said first and second shift fork means toward each other and rotation of said shaft means in said other direction urges displacement of said first and second shift fork means away from each other.

17. The gear shifting arrangement as recited in claim 14, wherein
said shaft means includes first and second threaded portions for respectively displacing said first and second drive means axially of said shaft means.

18. The gear shifting arrangement as recited in claim 17, wherein
each of said first and second drive means includes drive nut carried by and displaceable with respect to said first and second threaded portions.

19. The gear shifting arrangement as recited in claim 18, wherein
said first and second shift fork means each include a pair of upstanding drive lugs disposed on opposite sides of each of said drive nuts, and
said first and second drive means each further include a pair of drive springs each disposed between a respective side of said drive nut and one of said drive lugs.

20. The apparatus set forth in claim 18, wherein said motor means includes a worm gear and a motor, said worm gear coupling the rotatable portion of said motor to said threaded shaft.

21. The gear shifting arrangement as recited in claim 15, and
gear means for translating movement of said motor means into rotation of said shaft means, said gear means including means for accommodating axial movement of said shaft means relative to said motor means.

22. The gear shifting arrangement of claim 14 or 17, wherein
said control means includes shift fork lock means for selectively preventing displacement of said first and second shift fork means.

23. The gear shifting arrangement as recited in claim 22, wherein
said control means further include
a manually operable gear selector, and
a switching matrix operatively connected with said gear selector, said fork lock means and said motor means whereby manipulation of said gear selector for selection of power transmission through one of the gear pairs of the transmission signals said switching matrix which signals said motor means to selectively rotate said shaft means and signals said fork lock means to selectively prevent displacement of one of said first and second shift fork means whereby said shaft means displaces said other of said shift fork means whereby its respective coupling means is moved from its neutral position to one of its power-transmitting positions for transmission of power from the input to the output shaft through said one gear pair.

24. An apparatus for changing the speed ratio of a geared transmission, said transmission including a housing which rotatably carries an input shaft which carries a first gear for rotation therewith, a rotatable output shaft which rotatably carries a second gear which is enmeshed with said first gear, and sliding coupling means, axially shiftable along said output shaft between a first engaged position for connecting said output shaft to said second gear for rotation therewith and a neutral position, comprising:

(a) a threaded shaft carried by said housing;
(b) reversible motor means carried by said housing, for rotating said threaded shaft; and
(c) shift fork means, carried by said housing and coupled to said threaded shaft, for moving said coupling means between its neutral and its first engaged position, whereby the rotation of said motor means in one direction rotatably connects said input shaft and said output shaft and rotation of said motor means in the opposite direction disengages said input shaft from said output shaft.

25. The apparatus set forth in claim 24, further including control means, carried by said housing, for de-energizing said motor means when said first gear is in its engaged position.

26. The apparatus set forth in claim 25, further including lock means, operationally associated with said control means, for selectively holding said shift fork means stationary when said coupling means is in its neutral position.

27. The apparatus set forth in claim 26, wherein said lock means is carried by said shift fork means and wherein said lock means includes an electrically operated solenoid.

28. The apparatus set forth in claim 25, wherein said control means includes position detector means for determining the position of said shift fork means relative to said housing.

29. The apparatus set forth in claim 24, wherein said shift fork means is slidably disposed along a guide rail which parallels said output shaft and includes a pair of drive lugs adjacent to said threaded shaft, and said shift fork means is coupled to said threaded shaft by a drive nut disposed within said drive lugs and threadably connected to said threaded shaft, whereby the rotation of said threaded shaft in one direction by said motor means drives said nut towards one of said drive lugs which forces said shift fork means to slide axially along said guide rail in a first direction and rotation of said threaded shaft in the opposite direction drives said drive nut towards the other of said drive lugs which forces said shift fork means to slide axially along said guide rail in the opposite direction.

30. The apparatus set forth in claim 27, wherein said shift fork means is slidably disposed along a guide rail carried by said housing, and said solenoid includes plunger means for engaging said guide rail when said solenoid is de-energized, the energization of said solenoid thereby freeing said shift fork means to slide along said guide shaft.

31. The apparatus set forth in claim 24, further including a third gear which is rotatably carried by said output shaft, and a fourth gear connected to said input shaft and enmeshed with said third gear, said coupling means being axially shiftable along said output shaft between a second engaged position coupling said third gear to said output shaft and said neutral position, said neutral position being between said first engaged position and said second engaged position, whereby rotation of said motor means in one direction connects said input shaft and said output shaft together for power transmission therebetween in a first speed ratio and rotation of said motor means in the opposite direction connects said input shaft and said output shaft together for power transmission therebetween in a second speed ratio.

* * * * *

UNITED STATES PATENT AND TRADEMARK OFFICE
CERTIFICATE OF CORRECTION

PATENT NO. : 4,449,416

DATED : May 22, 1984

INVENTOR(S) : Thomas W. Huitema and Jack Reinhardt

It is certified that error appears in the above-identified patent and that said Letters Patent is hereby corrected as shown below:

On the title page, Item [75] Inventors: should read:
Thomas W. Huitema, Racine, Wis. and
Jack Reinhardt, Racine, Wis.

Column 6, line 16, after "of the" (first occurrence) insert --deepest portion--

Signed and Sealed this

Nineteenth Day of February 1985

[SEAL]

Attest:

DONALD J. QUIGG

Attesting Officer

Acting Commissioner of Patents and Trademarks